United States Patent [19]

Bryant et al.

[11] 4,008,460
[45] Feb. 15, 1977

[54] CIRCUIT FOR IMPLEMENTING A MODIFIED LRU REPLACEMENT ALGORITHM FOR A CACHE

[75] Inventors: Louis R. Bryant, Poughkeepsie; Raymond J. Pedersen, Staatsburg; Arnold Weinberger, Poughkeepsie, all of N.Y.

[73] Assignee: International Business Machines Corporation, Armonk, N.Y.

[22] Filed: Dec. 24, 1975

[21] Appl. No.: 644,006

[52] U.S. Cl. .............................................. 340/172.5
[51] Int. Cl.² ..................... G06F 7/10; G11C 9/06
[58] Field of Search ................................ 340/172.5

[56] References Cited

UNITED STATES PATENTS

| | | | |
|---|---|---|---|
| 3,217,298 | 11/1965 | Kilburn et al. | 340/172.5 |
| 3,277,447 | 10/1966 | Newman et al. | 340/172.5 |
| 3,422,401 | 1/1969 | Lucking | 340/172.5 |
| 3,466,613 | 9/1969 | Schlaeppi | 340/172.5 |
| 3,541,529 | 11/1970 | Nelson | 340/172.5 |
| 3,670,307 | 6/1972 | Arnold et al. | 340/172.5 |
| 3,699,533 | 10/1972 | Hunter | 340/172.5 |
| 3,840,863 | 10/1974 | Fuqua et al. | 340/172.5 |
| 3,866,183 | 2/1975 | Lange | 340/172.5 |
| 3,889,243 | 6/1975 | Drimak | 340/172.5 |
| R26,624 | 7/1969 | Bloom et al. | 340/172.5 |

*Primary Examiner*—Melvin B. Chapnick
*Attorney, Agent, or Firm*—Bernard M. Goldman

[57] ABSTRACT

A digital LRU network in which a use value in a chronology register always appears to be increasing; it is incremented for each access to a different data block currently represented in an active LRU array and this use value is copied into an index for that block in an active use-value array. Special circuits are provided to maintain the appearance of continuously increasing use values. At the start of each array search, the special circuits check the chronology register to determine if its use value is nearing its highest registerable value by testing its two high order bits for 1's. If so, the chronology register is set to 100...0, which is higher than any use value in the active array, after the use values in the active array are shifted one bit position to the right by writing them into corresponding positions in another array, which then becomes the active array. The right shift drops the low-order bit in the use values and sets the high-order bit to zero. The right shift increases the range of use values that can subsequently be set into the active array without affecting the stored relationships among the existing use values, and enables the incrementing of use values to continue. The second array is used to permit overlap of the read cycle of one array with the write cycle of the other array.

16 Claims, 14 Drawing Figures

FIG. 1  STANDARD LOGIC ELEMENTS
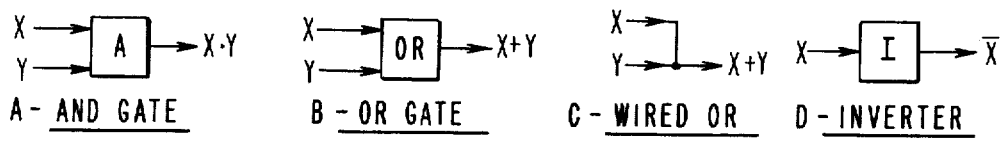
A - AND GATE   B - OR GATE   C - WIRED OR   D - INVERTER
FIG. 2  SINGLE-BIT STORAGE ELEMENTS
A - TRIGGER FLIP-FLOP     B - REGISTER STAGE
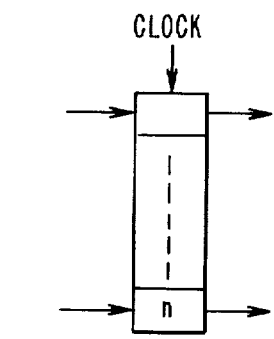
FIG. 3  n-BIT REGISTER
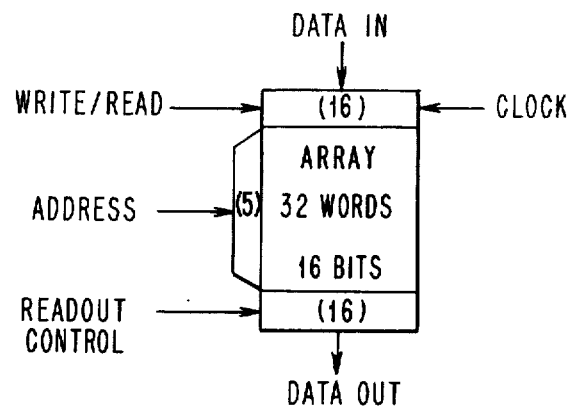
FIG. 4  MEMORY ARRAY
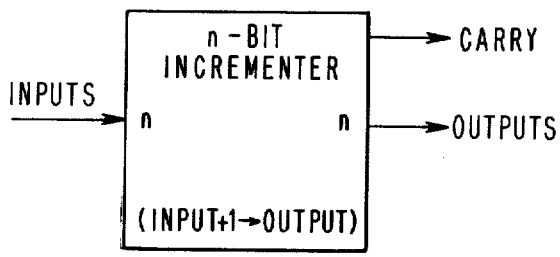
FIG. 5  INCREMENTER
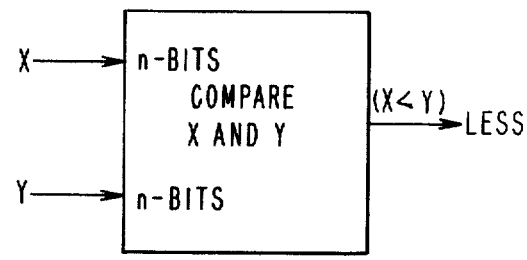
FIG. 6  COMPARATOR (X<Y)

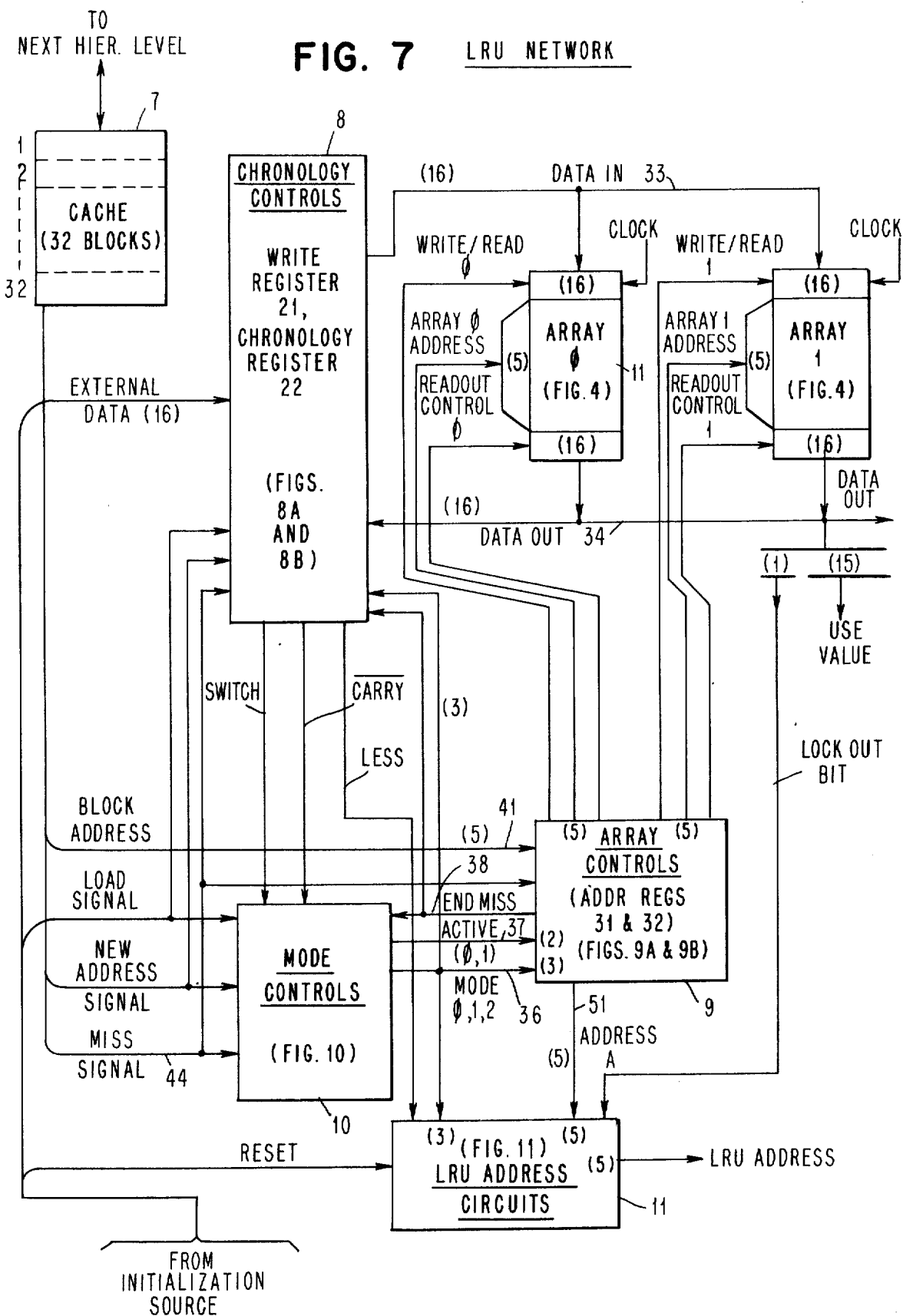
FIG. 7 LRU NETWORK

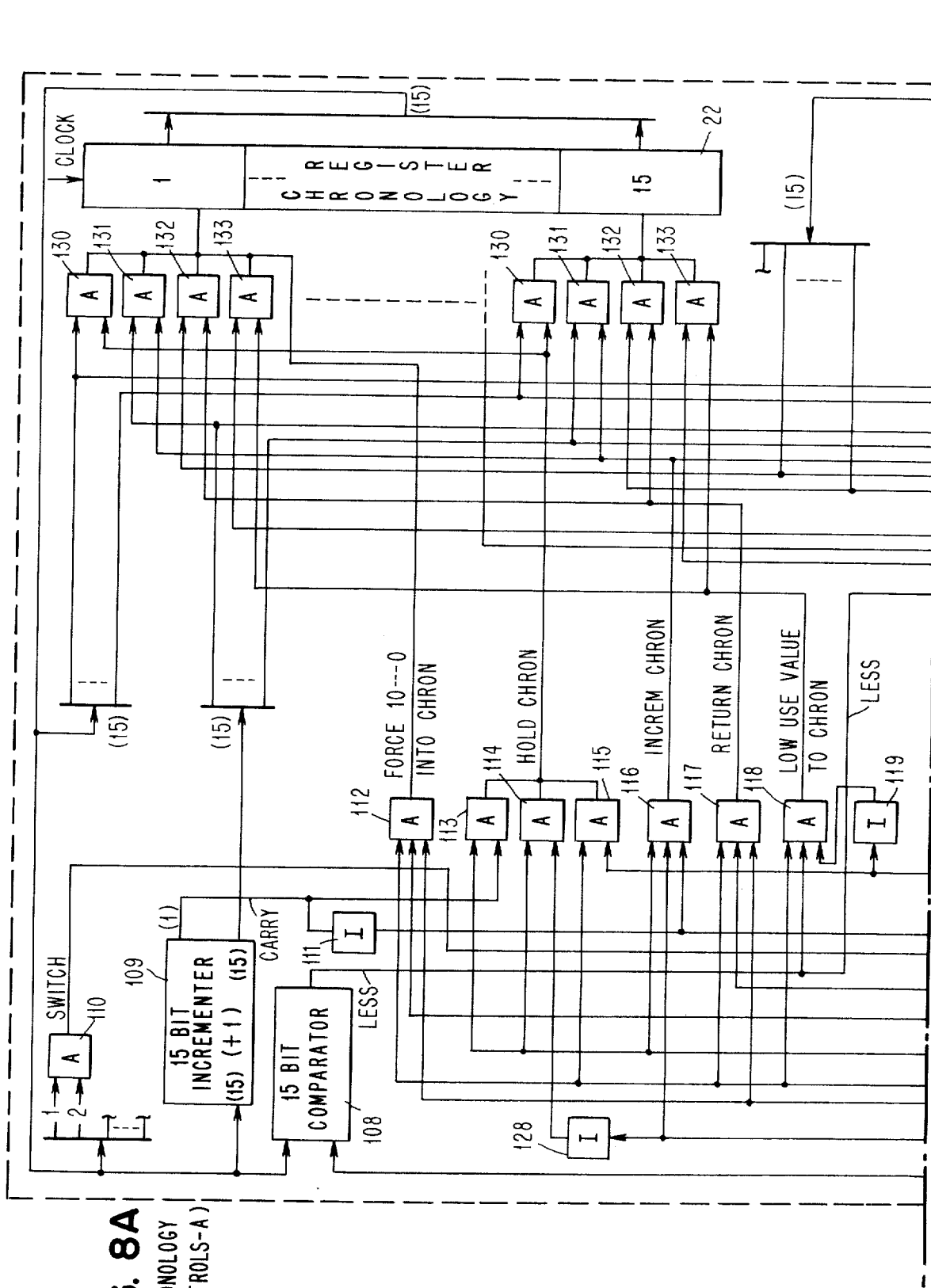
FIG. 8A (CHRONOLOGY CONTROLS-A)

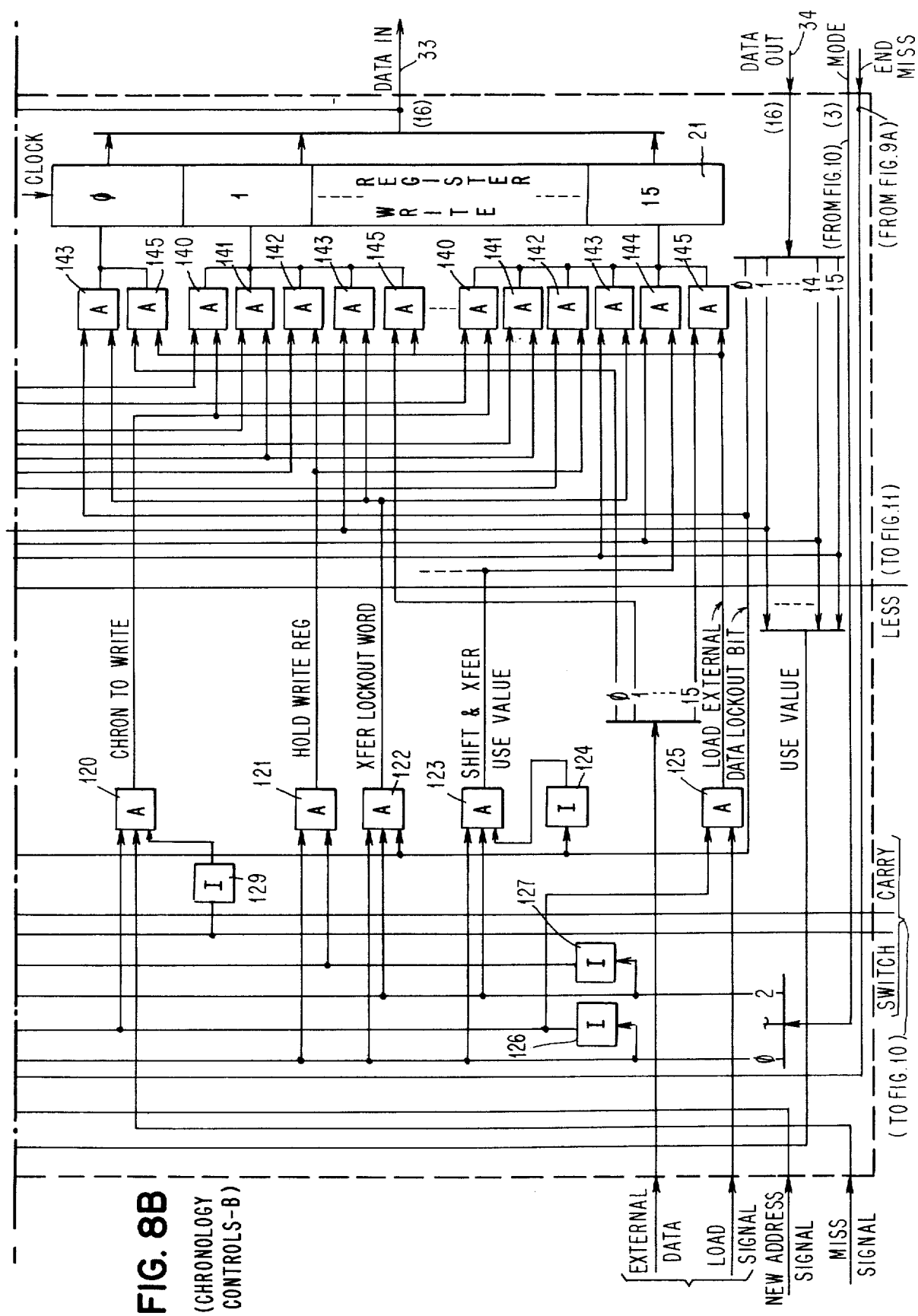

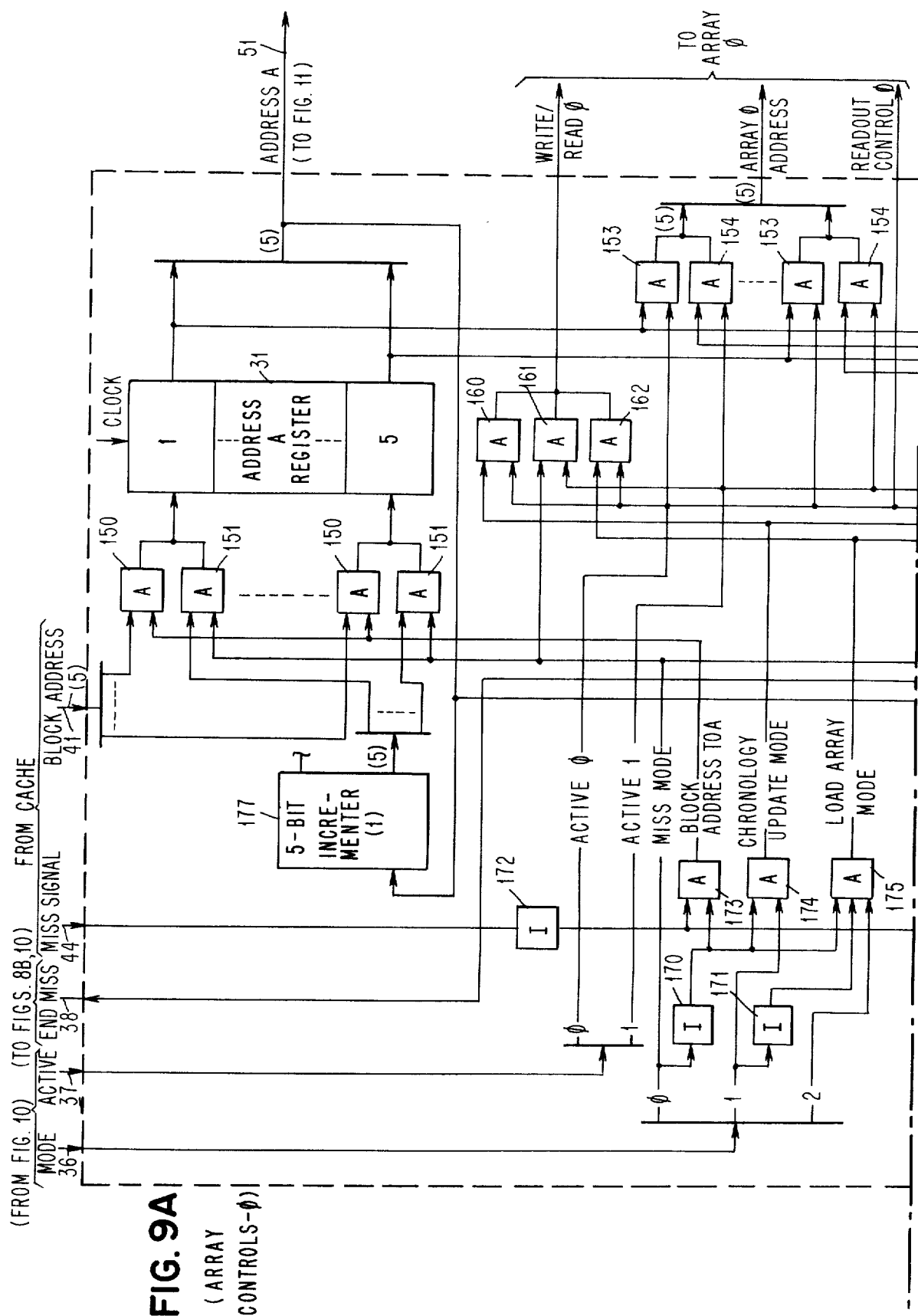

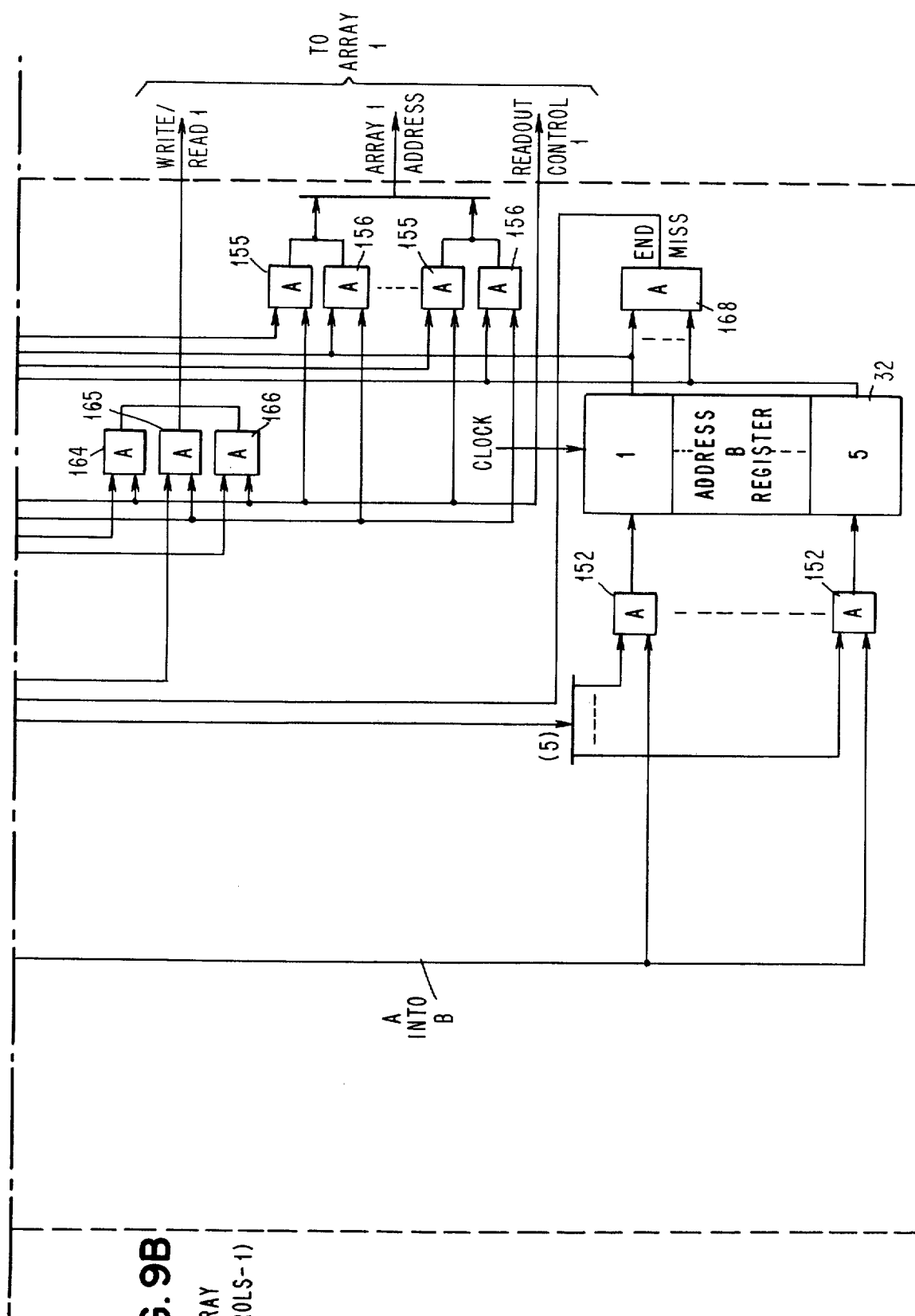
FIG. 9B (ARRAY CONTROLS-1)

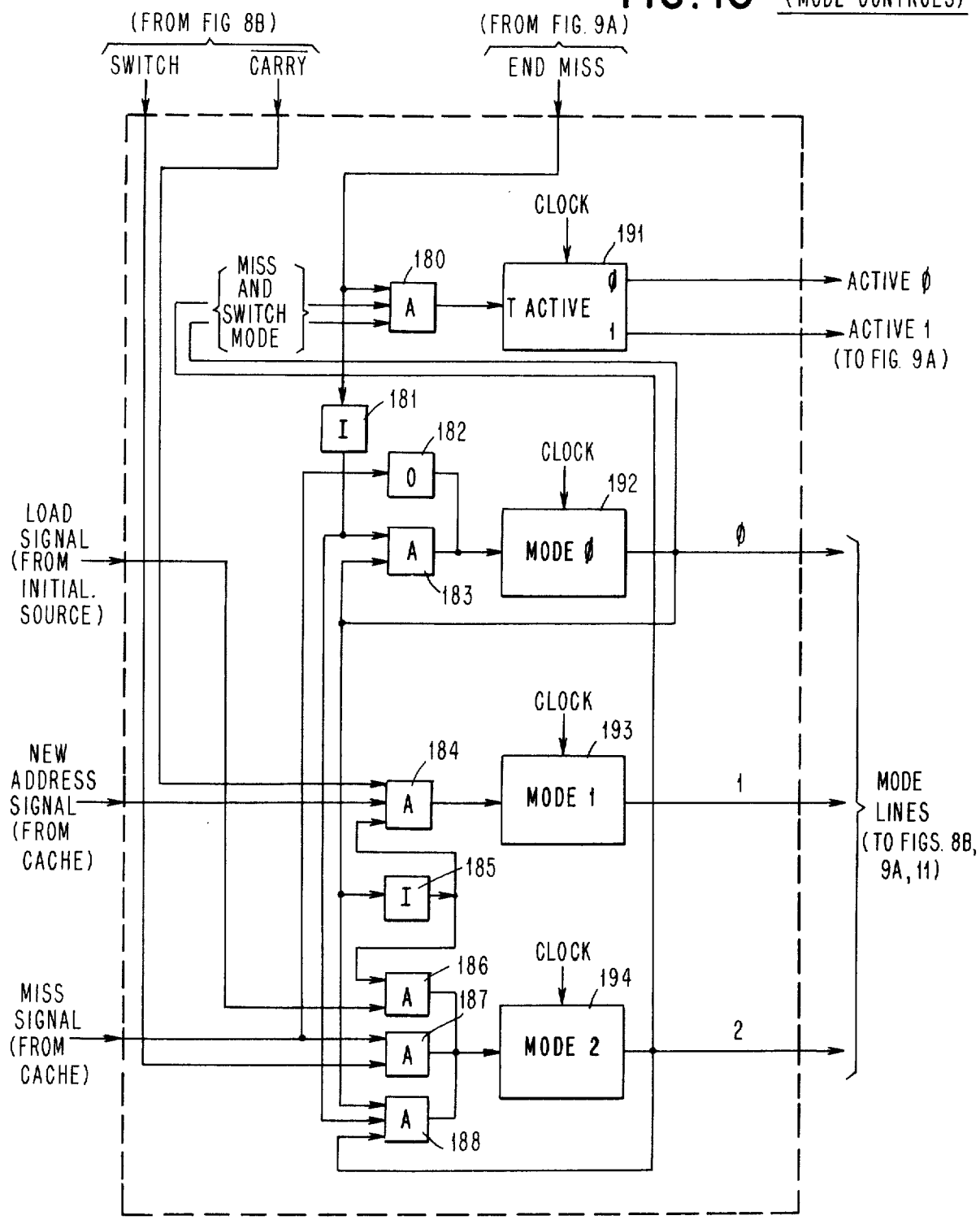
FIG. 10 (MODE CONTROLS)

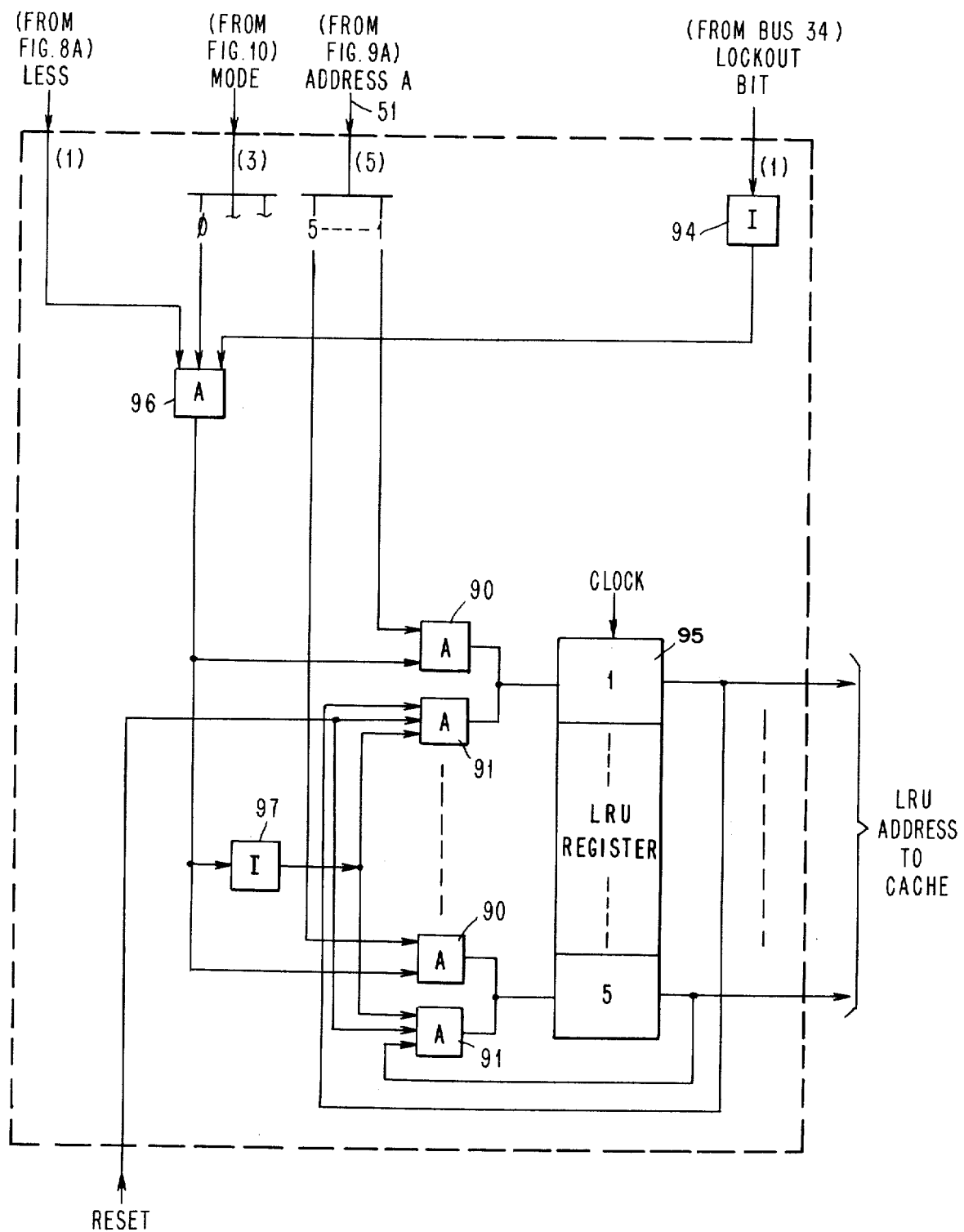
FIG. 11 LRU ADDRESS CIRCUITS

CIRCUIT FOR IMPLEMENTING A MODIFIED LRU REPLACEMENT ALGORITHM FOR A CACHE

The efficiency of a multilevel/memory hierarchy is significantly enhanced by use of a circuit which applies an efficient replacement algorithm to any buffer level requiring block or page replacement as data or instructions move through the respective buffer level. The replacement algorithm determines what block or page frame in a full buffer level is to have its contents replaced.

One such known algorithm is LRU (Least Recently Used), whereby the block in the buffer which was referenced least recently (i.e. longest not used) is assumed to be least important, and therefore can be written over, i.e. replaced with minimum system performance impact.

LRU requires a method of keeping track of the relative usages of the contents in the respective blocks in the buffer. One conventional approach has been to keep the block addresses, or their representation, in a push-down stack, the position in the stack denoting relative usage of the respective block contents. Push-down stacks have been designed historically with latching devices, and depending upon the size of the buffer and the size of the block, the stack can become quite large and expensive to implement.

Another LRU algorithm is published in an article by R. M. Meade entitled "Design Approaches for Cache Memory Control" in COMPUTER DESIGN, January 1971, page 87-93, and utilizes binary values stored in an associative array as the means of retaining the chronology of usage of the blocks within a buffer. When a block is accessed, it is assigned a value which is one greater than the value assigned to another block which was last accessed before the current block. Thus, the next block accessed is always assigned a use value one greater than assigned to the last accessed block, and so on. The block with the highest assigned value at any time would be the one accessed last, and it would be the most recently used (MRU) block. Similarly, the block which has the lowest use value would be the least recently used (LRU). Values are assigned only upon the first access to a particular block, and remain unchanged for all successive accesses to that block, distinguishing this algorithm from least frequently used. The Meade article uses an array of words that can be randomly accessed. Each word can also be shifted one bit position at a time in parallel with other words for the purpose of detecting the lowest value. The array of words are of sufficient density and access time to hold the chronology values associated with each block. These replace the push-down stack or the associative table as the means for retaining relative usages. The array must have at least as many words as the number of blocks involved, so that there is a one to one correspondence between blocks in the buffer and array words. Unlike the push-down stack where addresses are moved about on the stack, this scheme assigns different values to stationary addresses within the array.

Problems with the Meade algorithm are that continuously increasing the use count must soon exceed the finite capacity of any counter. At such time, it is reset or wraps around to zero and no longer can implement the LRU algorithm since the relative use values are thereafter erroneous. It then is necessary to also reset all current use values and lose all LRU information for the buffer and use some other algorithm than LRU until sufficient new use values are applied to the blocks in the buffer so that the LRU algorithm can again be used. This reset or wrap around problem is solved by this invention.

Another problem with the Meade algorithm is that its LRU algorithm requires a significant amount of processing time, equal to the time for shifting out a word in the LRU array one bit at a time, each time a block or page must be replaced in the buffer. The block or page replacement time is correspondingly increased by the LRU algorithm, which slows down system performance. This time increase problem is solved by this invention by avoidance of any increase in replacement time due to the LRU algorithm.

Still another problem with the Meade algorithm is that the shifting provision for the array of words makes the array nonstandard and expensive, thereby precluding the use of high-density random access memory array chips. This invention uses such memory array chips.

SUMMARY OF THE INVENTION

The invention operates with a storage hierarchy buffer such as a cache, with an LRU network which utilizes two array memory chips, array selection and addressing controls, chronology controls, next LRU addressing circuits, and mode controls for controlling the different types of operations needed by the LRU network. Each time a different block is accessed in the cache, a next use value is generated in a chronology register in the chronology controls, and the new use value is written into the active one of the arrays at a position which corresponds to the position of the block to be replaced in the cache. An LRU determination is made when a cache miss occurs by making a search of the active array to find the position of the block with the lowest use value, which block position is thus determined to be the LRU. This LRU block address is then stored in the next LRU addressing circuits for use by the next block replacement in the cache, i.e. next miss.

The invention avoids the undesirable wrap-around condition of the chronology register. At the start of the array search, the use value in the chronology register is checked to determine if it is nearing its highest countable value (e.g., if its two high order bits are 1's). If so, the use values in the active array positions are read out and compared against each other during the search to determine the LRU; and then they are shifted one bit position to the right and written into corresponding positions in the alternate array, which then becomes the active array. The right shift drops the low order bit in the use values and sets the high order bit to zero; this increases the range of use values that can subsequently be set into the active array without affecting the stored relationships among the existing use values. (In rare instances the dropped last bit may yield two equal use values which may become the LRU during a subsequent miss. Either may be selected.) The second array is used in order to be able to overlap the read cycle of one array with the write cycle of the other array. (A single array could be used with the speed penalty of taking two serial machine cycles for each position, one for read and one for write, through a buffer register.)

Upon completion of the search and shift operation, the chronology register is set to 100...0, which will then be higher than any use value that exists in the active array since they have a "0" in the bit position corresponding to the "1" bit in the chronology register. Thus, the chronology register value is ready to be written into the next accessed position in the active array. Having shifted the values into the active array, they are used until another shift becomes necessary, at which time the values will be shifted back again. Thus, the invention obtains the advantage of providing chronology use values which always appear to be increasing, so as to maintain the relative use value relationships for any subsequent LRU determination.

In the event that no cache miss occurs over so long a period of time that the chronology register reaches an "all 1's" state, the chronology controls stop the updating of the use values, which retain their then existing values until a cache miss does occur and the normal search/shift operation can be performed.

To determine the least recently used (LRU) block requires a search of the array comparing each word's value with the previous one and saving the address of the block with the lowest use value as the LRU block. This LRU determination takes a number of machine cycles to complete, depending upon the size of the array. This operation is performed by this invention when a miss occurs in the buffer and overlaps the paging operation for transferring the block from a different level in the hierarchy into the buffer. The block transfer time during the paging is long enough so that the overlapped LRU processing can be completed during the same time period. This paging operation with the invention uses the LRU block address determined during the previous buffer miss for its current operation of overlaying a block in the buffer. The LRU block address determined during the current paging operation will therefore be used for the next miss making this invention use a "modified" LRU replacement algorithm.

If the block currently picked as the LRU is accessed again before a miss occurs, it will still be replaced in the buffer even though its status has changed to the most recently used (MRU) block. The assumption is that if a position remains idle long enough to become the LRU, it is not used frequently enough so as to impact system performance when it is written over, even if it was just accessed and has become MRU. Furthermore, the frequency in which such a condition might occur is low enough to have virtually no performance impact. (An alternative is to latch such condition to indicate that the picked LRU block has become MRU prior to the next miss; and, based on the state of the latch, take the necessary number of non-overlapped cycles to determine the actual LRU and replace it instead. Another alternative is to store both the LRU and the second lowest LRU during each search for use during the next miss. If the LRU block is accessed in the interim but not the second lowest LRU block, the latter block is replaced instead.)

The foregoing and other objects, features and advantages of the invention will be more apparent from the following more particular description of the preferred embodiments of the invention illustrated in the accompanying drawings of which:

DESCRIPTION OF THE DRAWINGS

FIGS. 1 through 6 illustrate drawing representations for conventional circuit elements used in the detailed embodiment of the invention shown in the remaining figures.

FIG. 7 is a layout for a preferred embodiment of the invention.

FIGS. 8A and 8B illustrate the chronology controls in detail.

FIGS. 9A and 9B illustrate the details in the array controls.

FIG. 10 illustrates the mode controls in detail.

FIG. 11 shows the details for the LRU address circuits.

CIRCUIT ELEMENTS USED IN THE DETAILED EMBODIMENT

Figure 12:
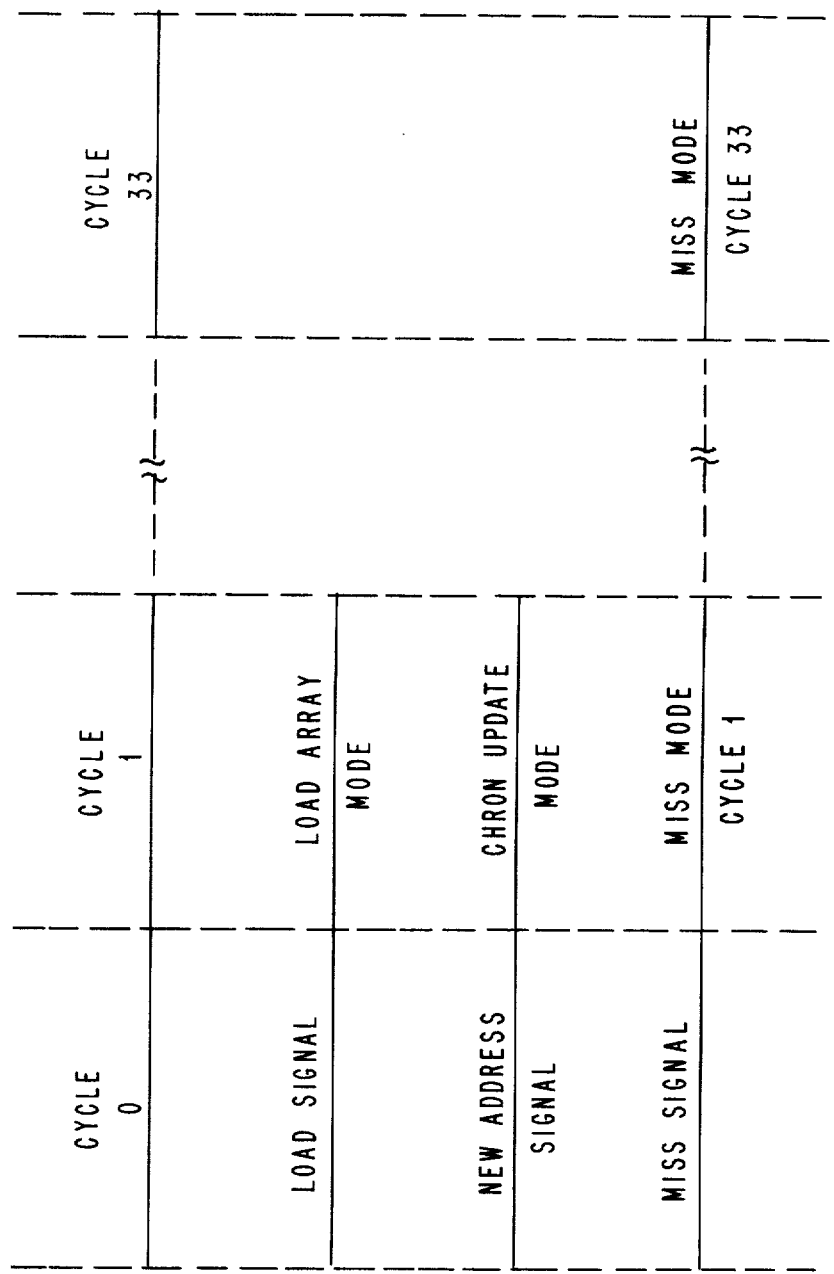
FIG. 12 represents the machine cycles in the LRU network.

FIGS. 1 through 6 describe standard logic elements used in the detailed embodiment. Combinational logic circuits use ANDs, ORs, wired-ORs, and inverters shown respectively in FIGS. 1A through 1D. Storage elements assume a synchronous clocked system in which a clock signal occurs every cycle to determine whether and how the input affects the output. In a trigger flip-flop (FIG. 2A), if the input signal is on during the clock pulse, the state of the flip flop is inverted, i.e. if the 0-output was off and the 1-output was on, they will be on and off respectively during the succeeding cycle and vice versa. In the register stage (FIG. 2B), if the input is on (off) during the clock pulse, the output will also be on (off) during the succeeding cycle. An n-bit register (FIG. 3) consists of n register stages.

A memory array (FIG. 4) contains several words of storage of which only one may be accessed during a cycle for reading or writing but not both. The word is selected by means of an address. In this example, the array contains 32 words by 16 bits. The address therefore is 5 bits to select one of the 32 words. During read, the signal WRITE/READ is off and inhibits the write clock signal, so that the input bus DATA IN is ineffective. The array acts as an unclocked combinational logic block with the address selecting the word available to the DATA OUT lines. A control signal, READ-OUT CONTROL permits the selected word to exit from the memory array on the DATA OUT lines. Thus, two or more memory arrays can have their outputs wire-ORed bit-wise to the DATA OUT lines, and a word from only one of the arrays is provided, which is from the array which has its READ-OUT CONTROL on, with the READ-OUT CONTROL being off to the other array.

FIG. 5 is a block diagram of a conventional incrementer, the function being well known and readily found in the literature, so that it is not necessary to describe the detailed logic implementation. The input, an n-bit number, is incremented by 1 and emitted as an n-bit output which represents a number one greater than the input. In addition, an extra output signal is produced to indicate whether a carry from the highest bit position occurs. For example, an input 5-bit number, 10011(=19) produces the output 10100(=20) and carry =0. An input 11111(=31) produces the output 00000(=0) and carry =1.

FIG. 6 is a block diagram of a conventional comparator. It has two inputs which are n-bit numbers X and Y that are compared. If X < Y, the output signal LESS is on; otherwise, LESS is off which signals X ≥ Y.

THE PREFERRED EMBODIMENT

The preferred embodiment of the LRU network is described in the block diagram of FIG. 7. Its detailed circuitry is shown in the figures noted in the blocks of FIG. 7.

The LRU network operates under control of cache 7. The cache 7 is a conventional type of high-speed low-capacity buffer in a memory hierarchy. It contains 32 multi-word blocks, which can record control words, instructions or data. A word addressed by an associated CPU (not shown) is likely to be resident in one of the blocks in the cache. If the addressed block is not located in the cache, a "miss" is signalled and the block is retrieved at a slow rate from a larger but slower level in the memory hierarchy and placed in one of the 32 block locations in the cache, replacing the prior content of that block. The LRU network determines the block location where the missing block is to be placed, using a modified form of a known least-recently-used (LRU) algorithm.

The mechanism to implement the modified LRU algorithm uses a chronology register 22 in a chronology control 8 in FIG. 7. The use value in register 22 is incremented by one by an incrementer 109. In the detailed embodiment, a 15-bit chronology register is used with a 15-bit incrementer to generate sequential chronology use values. The LRU network is put into various modes in order to perform its required operations.

The six modes which can be set in mode controls 10 are indicated in the following Mode Table:

MODE TABLE

| Bits | | | |
|---|---|---|---|
| 0 | 1 | 2 | |
| 0 | 0 | 0 | Quiescent Mode |
| 0 | 0 | 1 | Load-Array Mode |
| 0 | 1 | X | Chronology-Update Mode |
| 1 | X | 0 | Miss-Without-Switch Mode |
| 1 | X | 1 | Miss-And-Switch Mode |
| 1 | X | X | Miss Mode (Either 1 X 0 or 1 X 1) |

In the Mode Table, X represents a "don't care" bit which may be a 0 or 1. The timing for the different mode operations is shown in FIG. 12, in which the mode determination in mode controls 10 is made in cycle 1.

QUIESCENT MODE

The quiescent mode exists when nothing is being changed in the LRU network. During normal operation of the cache the quiescent mode exists most of the time. It exists during the second and subsequent reference into a block of information existing in the cache during a continuous sequence of accesses to the same block in the cache. During the first access to a block in the cache, the LRU network will be in the Chronology Update Mode, during which the use value for that block in the active array is increased by one.

The quiescent mode occurs whenever in FIG. 7, no signal is provided to the mode control 10, i.e. the LOAD, NEW ADDRESS and MISS signals are all off.

LOAD ARRAY MODE

The load array mode is provided in order to initialize the LRU network to have it start in a predetermined manner when the system having the cache is started. In FIG. 7, an INITIALIZATION SOURCE initializes the LRU address, sets one of the arrays to active state, and sets the use values in the active array so that the miss address is predetermined when the system having the cache is started. The initialization is initiated by either the system's initial program load (IPL) or initial microprogram load (IMPL) which will reset the LRU network, select the active array, set an initial block address in the LRU address register in LRU address circuits 11 for determining the first block to be replaced, and loading a set of values into the active array (such as loading all zeros in the word for the second block to be replaced and loading 0 . . . 01. in all the other words), and setting the chronology register to 0 . . . 01.

CHRONOLOGY UPDATE MODE

Whenever a different block currently in the cache is referenced, the cache dispatches a signal on the line labeled, New Address, to mode controls 10 which then enters a Chronology Update Mode. As a result, the contents of chronology register 22 are incremented, and the incremented value is also stored in the write register 21 from which it is transferred on data in bus 33 to the corresponding word in the active array (which is a selected one of arrays 0 or 1). The chronology update mode is active only during the first reference to the block and the LRU network switches to quiescent mode on each subsequent sequential reference to the same block.

MISS MODE

When a miss occurs in the cache 7, the referenced data is missing from the cache, and the miss signal is transferred by the cache to mode controls 10 to force it into a miss mode. The miss mode is generic to the miss-without-switch mode and the miss-and-switch mode. The miss-without-switch mode is the usual mode used when a miss occurs which is while the chronology use value is not in danger of over-flowing. The miss-and-switch mode is used under the unusual circumstance when the chronology use value is in danger of ovrflowing.

MISS-WITHOUT-SWITCH-MODE overflowing.

An LRU address circuit 11 in the LRU register 95 contains the current address of the LRU block in cache 7 where the missing data is to be placed. If this block was referenced since the last miss when it was determined to be the LRU block, it would no longer be the least-recently-used block at the time of the present miss. Nevertheless, even if it was referenced since the last miss, the block would still be a good choice for replacement, since it has recently (i.e. at the time of the last miss) been found to be the best choice. The overriding advantage of using a previously determined LRU block address is that no additional time need be added to the normal block transfer time to determine the replacement block address, so that the LRU network will not slow down the block transfers to the cache.

Thus, during the multiple cycles in which the cache is receiving the missing data, the LRU network in FIG. 7 simultaneously determines the current LRU block from the present contents of the active array, as follows: First, in chronology controls 8 the content of chronology register 22 is temporarily stored in the write register 21 so that chronology register 22 can be used as a compare register. Then, in array controls 9, the 5-bit address A register 31 is sequentially cycled through all the cache block addresses 0 through 31 for scanning the corresponding use values in the words in the active array. During each cycle, address A register 31 selects the corresponding word of the active array. The 15-bit use-value field of each selected word in the array is compared with the prior word's "use value" contents in the chronology register 22, and the lower use value of the two adjacent words (determined by the comparison) is left in the chronology register 22. If the comparand from the array field use value is less than the comparand in register 21, a signal on the LESS line causes the current address in address A register 31 to be copied into the LRU register 95 in LRU address circuits 11. At the end of 32 cycles (for the 32 array words), the LRU register will contain the array word address having the lowest use value, which address is also the LRU block address in LRU register 95. This LRU address will be used during the next cache miss.

During the 33rd cycle, the chronology use value temporarily stored in the write register 21 is returned to the chronology register 22, and the miss mode is terminated. The end of the 33rd cycle is indicated by a signal on a line labeled END MISS from array controls 9 to mode controls 10, which causes the LRU network to switch to the quiescent mode on the next cycle in the absence of signals which would cause another mode to be selected.

MISS AND SWITCH MODE

A special LRU operation is provided if ever a miss is initiated when the chronology use value is in danger of overflowing. This condition is detected by the presence of 1's in the high-order two bits of chronology register 22. The detection of the two 1's produces a signal on a line labeled SWITCH from chronology controls 8 to mode controls 10. When a miss signal from the cache coincides with a switch signal, a miss-and-switch mode is entered, instead of the previously described miss-without-switch mode (see mode table above).

The active array is searched by array controls 9 for the position of the lowest use value. As the words containing use values are sequentially read out from the active array, each 15-bit word is simultaneously divided by 2, i.e., it is shifted right by one bit position as it is transferred into the write register 21 in chronology control 8. Also at the same time, address A register 31 is copied into address B register 32 which selects the correspondingly positioned word in the inactive array, into which the shifted use value is written from write register 21. During shifting, any preshifted use value of 1 in its high-order bit position (bit position 1) is shifted into bit position 2 of write register 22, leaving a 0 value in bit position 1 of the write register. The preshifted bit value in position 15 (low-position) is lost.

At the end of the 33rd cycle (address B lags one cycle behind address A), address B contains all 1's (=—), which is detected to end the miss mode by providing a detected signal on a line labeled end miss. At the end of the miss-and-switch mode, the chronology use value is changed. During the last (33rd) cycle of the miss-and-switch mode, the chronology register 21 is set to 10 . . . 0, representing a chronology use value higher than any of the shifted use values in the inactive array, but the new chronology use value is sufficiently far from overflowing to make it unlikely to overflow prior to the next miss. Also, during this last cycle, a control trigger labeled active flip-flop in mode controls 10 is flipped, so that the roles of the two arrays are interchanged, and thereafter the inactive array becomes the active array, and the active array becomes the inactive array.

The reason two arrays are needed is because one array cannot be accessed for a read operation followed by a write operation during the same cycle. If an array could be so operated with circuits which could perform a right shift within the array at all word positions except for the lockout bit position, a single array with a single address register would suffice. Such shiftable arrays are not economically practical at this time.

At the end of the block replacement operation, for both miss modes, the cache sends a signal on the line labeled new address which signals mode controls 10 to update the block address that had just been used as the LRU. The new address signal places the LRU network in the chronology update mode; and the use value field in the corresponding active array word is then updated.

LOCK OUT FEATURE

An additional feature in the embodiment is for a cache which can have block positions removed from normal use, as for example, due to some hardware error in one or more blocks of the cache, and such block positions are locked out of use. It is then necessary for the active array in the LRU network to indicate which blocks are locked out. The array word size is therefore extended to a bit position labeled Lockout Bit, making each array word 16 bits in size. The lockout bits are set during the load array mode by IPL or IMPL. An array word with a lockout bit=1 is not referenced during any mode, except the load array mode, since the corresponding buffer block position is unused for normal referencing. During a miss mode, when the active array is being sequentially searched, any word with its lockout bit on is not read out to the chronology register 22. Also, during a miss-and-switch mode, a locked out word enters write register 21 unshifted and is transferred from there to the corresponding position in the inactive array to insert the lock bit in its corresponding position. In this manner, the lock out bits are preserved as the LRU network operation switches between its two arrays. Furthermore, the array address of a locked out word does not enter the LRU register in circuits 11. By preserving the locked out word, the use value field may be used for other purposes by the cache.

CHRONOLOGY REGISTER OVERFLOW FEATURE

In the unlikely event that a miss does not occur for a long time and the chronology register overflows, i.e., it becomes all 1's, the chronology register updating is suspended, i.e. the new address signal is ignored, so that the update chronology mode is not entered. As a result, the old use values are retained in the words of the active array until the next miss occurs.

DETAILS IN THE PREFERRED EMBODIMENT

The details in the blocks of FIG. 7 are now explained with the use of FIGS. 8 through 11.

A control trigger, called active flip-flop 191 in FIG. 10, determines which memory array 0 or 1 is active. It operates like the trigger flip-flop shown in FIG. 2A. The arrays 0 and 1 in FIG. 7 each have a common set of data inputs connected to bus 33. The outputs of the arrays are wire-ORed bit-wise to the data out bus 34. An array can be written into during one cycle. Also an array can be read out during one cycle, but it cannot be both read from and written into in one cycle.

The 16 bits of each word in the memory arrays comprise two types of fields:

a. A 1-bit field provides the lockout bit position. It indicates whether the corresponding block location in the cache has been locked out. A 1 indicates the corresponding block is locked out; a 0 indicates it is not locked out. The lock out bit can only be changed in the load array mode. Therefore, if the lockout bit is on, its word will not be normally referenced, so that there will not be any writing into other fields of this word, which might destroy the lockout bit.

b. A 15-bit field is the use value field, which denotes the recentness of use of the corresponding block in the cache. The higher the use value number in this field relative to the use values in the other fields of the active array, the more recently its block in the cache has been referenced.

CHRONOLOGY CONTROLS 8 (FIG. 8)

The chronology controls 8 contain the 15-bit chronology register 22 and the 16-bit write register 21 and supporting logic circuits.

The main function of the chronology register is to act as the use value clock for the LRU network by storing the LRU network's highest current use value as a 15-bit number which is increased by one whenever a different block is referenced in the cache. This is done in the chronology update mode, in which incrementer 109 receives the current number in register 22, increases it by one, transfers the increased number to chronology register 22 as well as to write register 21, from which it is transferred to the data-in bus 33 into the currently addressed word in the active array as its new use value. Another function of chronology register 22 is during the miss mode when it is used to store temporarily the lowest use value in the active array while the latter is being searched to determine the LRU block. In more detail, the circuits in FIGS. 8A and 8B operate as follows to permit one of four data sources to enter chronology register 22:

a. Hold Chronology Use Value (gates 113, 114, 115): The content of chronology register 22 is held over for the next cycle by gates 130 under control of gates 113, 114, and 115. Gate 113 is enabled if incrementer 109 produces a carry (indicating that the chronology register 22 is about to overflow) and the LRU network is not in the miss mode (mode line 0 is complemented via inverter 126). Gate 114 is enabled if the LRU network is not in the miss mode and the cache does not produce a new address signal (i.e. inverter 128 is on). Gate 115 is enabled if the LRU network is in a miss mode (mode line 0 is on) but the word selected from the active array has a lockout bit so that the content of chronology register 22 is held over as containing the lowest use value determined so far.

b. Increment Chronology Use Value (gate 116): The incremented value, provided by the 15-bit incrementer 109 is entered via gates 131, as controlled by gate 116. This occurs when the LRU network is not in miss mode (i.e. inverter 126 on), and a new address signal enters from the cache and the incrementer 109 does not produce a carry output (inverter 111 is on).

c. Return Chronology Use Value (gate 117): Bits 1–15 of write register 21 enter chronology register 22 via gates 132 under control of gate 117. This occurs during the last cycle (end miss) of the miss-without-switch mode operation. (Mode line 0 is on and mode line 2 is off via inverter 127). The purpose is to return the last chronology register use value that has been temporarily stored in the write register 21 while register 22 was being used as a compare register.

d. Low Use Value to Chronology Register (gate 118): The use value received from an array on data out bus 34 is entered via gates 133 under control of gate 118. This occurs during a miss mode (mode line 0 is on) when the use value from data out bus 34 is found by comparator 108 to be less than the temporary lowest count found until now, and does not come from a locked out word (Lockout bit is off as derived from inverter 119). The comparator signal less is therefore on.

e. Force 10 . . . 0 into Chronology Register (gate 112): The value 10 . . . 0 is forced into the chronology register 22 via gate 112 during a miss-and-switch mode (mode line 0 and mode line 2 being on) while the last cycle is in progress (end miss on).

The write register 21 provides the write data input for the selected array on data in bus 33. Register 21 also serves as a temporary storage for the last chronology register use value when a miss-without-switch mode is initiated. One of six data sources can enter the write register as follows:

a. Chronology to Write (gate 120): Write register 21 receives bits 1–15 via gates 140 under control of gate 120 which permits the chronology register's use value to be temporarily stored in register 21 during a miss operation. Gate 120 is enabled when the cache sends a miss signal and the high-order 2 bits of the chronology register are not both 1's indicating that the pending miss mode will be a miss-without-switch mode. The no switch signal is provided from inverter 129.

b. Increment Chronology to Write Register (gate 716): The incremented value, provided by the 15-bit incrementer 109 is entered into the write register 21 via gates 141 as controlled by the same gate 116 which simultaneously controls the storing of the incremented use value into chronology register 22.

c. Hold Write Register (Gate 121): Bits 1–15 of write register 21 are held over via gates 142 under control of gate 121 when a miss-without-switch (i.e. mode line 0 is on and mode line 2 via inverter 127) is in progress. Write register 22 holds the last chronology use value temporarily.

d. Transfer Lockout Word (gate 122): The use-value word on the data out bus 34 is entered in write register 21 via gates 143 during a miss-and-switch mode (Mode line 0 and Mode line 2 on) if the lockout bit is on. This permits a locked out word to be transferred unchanged from the active to the inactive array with gate 122 providing the control.

e. Shift and Transfer Use Value (gate 123): The use value word being received on the data out bus 34 is shifted one bit to the right by gates 144 as the use value is entered into write register 21 (i.e. bit 1–14 on the data out bus 34 enter bit positions 2–15 of write register 21 via gates 144 under control of gate 123). This occurs during a miss-and-switch mode (Mode line 0 and mode line 2 being on) provided the word is not a locked out word, i.e., lockout bit is 0 as determined by inverter 124.

f. Load External Data (gate 125): An external data signal from an external initialization source is entered into register 21 via gates 145 under control of gate 125 when the cache sends a load signal while not in a miss mode (mode line 0 off as determined by inverter 126).

In FIG. 8B, chronology controls 8 output the three control signals labeled less, carry and switch to FIGS. 10 and 11.

ARRAY CONTROLS 9

The array controls 9 are shown in detail in FIGS. 9A and 9B. Controls 9 include the active and inactive array address registers, address A register 31 and address B register 32 respectively. In addition, it outputs a control signal on end miss line 38 to terminate the miss mode.

Address A register 31 is normally loaded from the cache's block address bus 41 via gates 150 which are controlled by gate 173. Gate 173 is enabled during a non-miss mode (mode line 0 is off as determined by inverter 170), and the cache does not send a miss signal (inverter 172 is on).

If a miss signal is sent on line 44, it is on during a cycle 0 (see FIG. 12), during which address A register 31 is cleared (set to 0) because all its input gates 150 and 151 are off when the clock occurs during cycle 0. Line 0 in mode lines 36 becomes active in cycle 1 to start a sequential search of the active array as address A in register 31 is incremented from 0 to 31 via the 5-bit incrementer 177 through gates 151 during cycles 1–32 while mode line 0 is on.

In FIG. 9A, the write/read 0 control signal is generated by gate 160, 161 or 162 to control writing or reading of the addressed word in array 0. Array 0 is written into when gate 160 is enabled by the LRU network being in a chronology update mode (gate 174 is on) and active line 0 being on. Array 0 also is written into if the LRU network is in a load array mode (gate 175 on) and active 0 is on, as seen by gate 162. Finally, array 0 will be written into if gate 161 is enabled by the LRU network being in a miss mode (mode line 0 is on) and array 0 is the inactive array by active line 1 being on. Writing into the inactive array is needed only during a miss-and-switch mode, but no reason exists for restricting it to this miss mode only.

Similarly in FIG. 9B the write/read 1 control signal is generated by gate 164, 165 or 166 for writing or reading into array 1. The conditions for these gates are the same as for writing into array 0 as discussed for gates 160, 161 and 162, except that active line 0 and active line 1 interchange in their roles for arrays 0 and 1.

The array 0 address line is connected to the output of address A register 31 via gates 153 when active line 0 is on, and from address B register 32 via gates 154 when active line 1 is on. Similarly, the array 1 address line is taken from the two address registers via gates 155 and 156 respectively when the active line signals are reversed. Read-out control lines 0 and 1 are respectively connected to active lines 0 and 1.

Address Then, register 32 is loaded from address A register 31 via gates 152 at all times except while a miss signal on line 44 is sent by the cache to initiate a miss mode. The, inverter 172 prevents address B register from being loaded and in fact, clears it by blocking gates 152 during a clock pulse. This way, address B always contains the address A value of the preceding cycle during a miss mode. During the 33rd cycle of a miss mode, the address B is 11111 (=32) which is detected by gate 168 which then produces the control signal, end miss.

MODE CONTROLS (FIG. 10)

Mode controls 10 contain four flip flops 191, 192, 193 and 194 that control the LRU network.

a. Mode bits 0, 1 and 2: They are provided by triggers 192, 193 and 194. They specify the types of operations that can take place in the LRU network, according to the indicated codes in the mode table, previously given. The mode is determined by the three input signals, load, new address, miss, as well as signals $\overline{carry}$ and switch from FIG. 8B. The $\overline{carry}$ signal is a result of not detecting an overflow condition in the incrementer 109. The switch signal is a result of detecting that the high-order two bits of the chronology register are 1's. The load, new address, and miss signals are mutually exclusive, i.e., not more than one is on during any one cycle.

When not in a miss mode (mode line 0 is off to provide an on output from inverter 185), a load signal during a cycle 0 will turn on mode bit 2 via gate 186 to initiate a load array mode during the succeeding cycle 1, since gates 182, 183 and 184 are not on, mode bit 0 being off prevents gate 183 from being on. The load array mode lasts for one cycle period (FIG. 12) to permit an external word to be entered into a word in the active array. The mode bit 2 output is prevented from latching register bit 194 via gate 188 because mode bit 0 is off.

When the new address signal is on, the chronology value is not about to overflow carry signal is on), and the miss mode signal is not present, gate 184 turns on the mode 1 register bit 193 to initiate the chronology update mode on during the succeeding cycle for one cycle.

When miss signal is on, the succeeding cycle begins a 33-cycle miss mode operation. Either a miss-without-switch mode (1×0) or a miss-and-switch mode (1× 1) is initiated. During a miss mode operation, no additional miss signals are expected, so that mode line 0 should be off when a miss signal occurs. The miss signal occurs during a cycle 0 (see FIG. 12), and initiates the miss mode via isolation circuit 182. If the chronology register high order bits 1 and 2 are both on, producing the switch signal from gate 110 in FIG. 8A, the switch signal combines with miss signal in gate 187 to turn on mode bit 2. Mode bit 0 is held on for 33 successive cycles via gate 183, i.e. until the end miss signal is off (as detected by inverter 181). Mode bit 2 is held on for the same number of cycles via gate 188 by inverter 181 and mode bit 0.

b. Active lines 0 and 1 for Active Trigger: The trigger 191 provides the complementary outputs labeled active 0 and active 1 in FIG. 10 which specify which of the two arrays is active. When the active 0 line is on, array 0 is active; when the active 1 line is on, array 1 is active. Trigger 191 is controlled by gate 180 during the last cycle (end miss) of a miss-and-switch mode (mode line 0 and mode line 2 on).

LRU ADDRESS CIRCUITS (FIG. 11)

The LRU address circuits 11 have the LRU register 41 which stores the address of the LRU block in the cache determined during the last miss mode. It is the LRU block address to be used by the cache to locate its block frame in which the missing block is to be entered. Register 95 is loaded from address A line 51 during a miss mode (mode line 0 on) via gates 90 in FIG. 11, when the lockout bit is off (inverter 94 on) for the selected word from the active array and its use value is found by chronology controls 8 to be less than the use value in chronology register 22 (less signal on). These conditions are detected by AND gate 96 in FIG. 11. The lowest use value is thereby entered into the LRU register 95. When AND gate 96 is off, inverter 97 is on, and it prevents the LRU register contents from being changed. Holding the LRU register content is done by gates 91, which feed back the register content to itself on each clock cycle, as long as inverter 97 is on, which occurs when the less signal is off, or the mode 0 signal is off, or the lockout bit signal is on. The reset signal from the initialization source can also clear the LRU register via gates 91.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An LRU control system for generating replacement addresses for a buffer level in a storage hierarchy, comprising
   at least one memory array having array words at positions corresponding to addresses of replaceable units in the buffer level,
   chronology means for generating a chronology use value which is digitally increased by a partial amount for each access to a different replaceable unit in the buffer level, means for inserting the chronology use value into an array word corresponding to the different replaceable unit for which an access is made,
   an LRU address circuit for storing the address of a selected replaceable unit which is to be replaced on a next miss signal of the buffer level indicating an access cannot be made because required data is not in the buffer level,
   array controls for searching the array words in the memory array on each miss signal for the word having the lowest use value, and storing the address for that word in the LRU address circuit as the replacement address for the next miss, and
   mode controls receiving each miss signal and actuating the array controls to search the memory array for the word having the lowest use value.

2. An LRU control system for generating replacement addresses for a buffer level in a storage hierarchy, comprising
   memory array means having array words at positions corresponding to addresses of replaceable units in the buffer level,
   chronology means for generating a chronology use value which is incremented for each access to a different replaceable unit in the buffer level, means for inserting the chronology use value into an array word corresponding to the different replaceable unit for which an access is made,
   an LRU address circuit for storing the address of a selected replaceable unit which is to be replaced on a next miss signal of the buffer level indicating an access cannot be made because required data is not in the buffer level,
   array controls for searching the array words in the memory array means on each miss signal for the array word having the lowest use value, and storing the address for that word in the LRU address circuit as the replacement address for the next miss,
   mode controls receiving each miss signal and actuating the array controls to search the array means for the word having the lowest use value,
   means for digitally decreasing the use values in words of the array means while maintaining the relative order of use values in the array means, means for actuating the decreasing means upon receiving a miss signal from the buffer level, and
   means for resetting the chronology use value to a lower value which is higher than all existing use values in the words of the array means.

3. An LRU control system as defined in claim 2, in which the means for decreasing comprises
   means for right shifting the use values in the words of said array means by at least one digit position.

4. An LRU control system as defined in claim 2, in which the means for resetting comprises
   means for setting on a high-order bit position in the chronology use value in the chronology means, and
   means for setting off the bit positions other than the high-order bit position in the chronology use value in the chronology means.

5. An LRU control system as defined in claim 2, in which the array means comprises a single storage array.

6. An LRU control system as defined in claim 2, in which the array means comprises a pair of storage arrays.

7. An LRU control system as defined in claim 6, further comprising
   array control bistable means for selecting one of the pair of arrays as an active array and the other array as an inactive array,
   buffer level new address controls for transferring incremented use values from the chronology means into words at corresponding addresses in the active array in response to the buffer level accessing a new address in a different replaceable unit,
   miss signal controls for transferring the use values in the words of the active array through a shifter device after receiving a miss signal from the buffer level to right shift the use values by at least one bit position, and
   means for resetting the chronology use value in the chronology means by setting at least one of its bit positions on and setting its other bit positions off to decrease the chronology use value to a value higher than any use value in the inactive array.

8. An LRU control system as defined in claim 7, further comprising
   mode control means having a plurality of mode bistable devices being set to different mode codes by a new address signal or a miss signal communicated from buffer level new address controls,
   outputs of said mode bistable devices being connected to the buffer level new address controls, to the miss signal controls, and to the array control bistable means.

9. An LRU control system as defined in claim 8, further comprising
   a load signal input being connected to the mode controls to set a mode code indicating the use values in one of the arrays and the address in the LRU address circuit is loadable from an external source.

10. An LRU control system as defined in claim 8, in which the array controls further comprise
    at least one array addressing register for addressing the words in the active array,
    a miss mode output of the mode control means being connected to the array controls to signal the occurrence of a miss in the buffer level, a logic circuit for setting the array addressing register to a predetermined address by a signal of the miss mode output, and an address incrementer connected to the array addressing register to increment its contents for addressing respective words in the active array for use in searching the active array for the lowest use value.

11. An LRU control system as defined in claim 10, in which chronology controls further comprise a write register for providing bits to be written into the active array, a chronology register and an incrementer connected to the chronology register for generating incremented use values, circuit means connected to a miss signal input for transferring the content of the chronology register to the write register upon the occurrence of a miss, array controls including read transfer circuits connected between a read output bus of the active array and an input to the chronology register to transfer therein the respective use values of the active array as words are addressed in the active array by the array addressing register, a comparator circuit having inputs connected to the read output bus and the chronology register for comparing each use value on the bus with the last read out use value in the chronology register, and comparator output controls providing a gating output for gating the use value on the read bus into the chronology register when the comparator circuit provides an output signal indicating the use value on the line is less than the use value in the chronology register, whereby the lowest use value in the active array is in the chronology register after all use values are read out.

12. An LRU control system as defined in claim 11, further comprising the chronology controls also including a right shift circuit connected between the read output bus and the write register, wherein each readout use value is decreased by a predetermined right shift when entered into the write register, the write register output being connected to an array write bus, and the array controls also including write transfer circuits connected between the write register and a write input to the inactive array for transferring the decreased use values into corresponding words in the inactive array.

13. An LRU control system as defined in claim 12, further comprising lockout bit control means including a bus connection circuit between like bit positions in the array read output bus and the array write bus prespecified to carry the lockout contents of the words in the active array into corresponding words in the inactive array upon the transfer of use values between correspondng words in the pair of arrays, wherein the lockout bit positions in the words of the active array are loaded from an external source.

14. An LRU control system as defined in claim 11, the LRU address circuit further including an LRU address register, and LRU address controls connected to the array addressing register and to the gating output of the comparator output controls for gating the content of the array addressing register into the LRU address register when each lowest use value is signalled by the gating output, wherein the LRU address register contains the address of the lowest use value in the active array at the end of an array search, and wherein the LRU register contains the LRU address for the next replaceable unit to be replaced in buffer level when the next miss signal is generated.

15. An LRU control system as defined in claim 14, further comprising the array controls further including an end miss signal generating circuit for sensing the last word cycle used to search the active array and providing an end miss signal output indicating completion of the search.

16. An LRU control system as defined in claim 15, further comprising the end miss signal output being connected to chronology reset controls, wherein the chronology reset controls set a predetermined chronology use value into the chronology register.

* * * * *